Dec. 12, 1961   I. D. SMITH   3,012,769
DOUBLE ACTING LIQUID SPRING
Filed Nov. 6, 1958   2 Sheets-Sheet 1

INVENTOR.
IRA D. SMITH
BY
*John E. Rempfer*
ATTORNEY

Dec. 12, 1961

I. D. SMITH 3,012,769

DOUBLE ACTING LIQUID SPRING

Filed Nov. 6, 1958

INVENTOR.
IRA D. SMITH
BY
ATTORNEY

United States Patent Office 3,012,769
Patented Dec. 12, 1961

3,012,769
DOUBLE ACTING LIQUID SPRING
Ira D. Smith, Bedford, Ohio, assignor to Cleveland Pneumatic Industries, Inc., Cleveland, Ohio, a corporation of Ohio
Filed Nov. 6, 1958, Ser. No. 772,326
8 Claims. (Cl. 267—64)

This invention relates generally to liquid springs and more particularly to a liquid spring which can be compressed or extended from a normal static position.

In the liquid spring disclosed in my co-pending application, Serial No. 725,210, filed March 31, 1958, a mechanism is provided which is capable of absorbing both tension and compression forces. However, in such a structure, it is necessary to provide a relatively long device for a given stroke capability. In a liquid spring according to this invention, the overall length of the spring is reduced for a given stroke capacity so the spring is suitable for use in confined areas.

It is an important object of this invention to provide a new and improved liquid spring which is capable of resiliently resisting both tension and compression forces.

It is another important object of this invention to provide a short double-acting liquid spring which is resiliently maintained in a static position but is operable to permit movement in both directions from the static position.

It is still another object of this invention to provide a new and improved double-acting liquid spring having damping orifices through which liquid is forced on both compression and extension of the spring.

Further objects and advantages will appear from the following description and drawings, wherein.

Figure 1:
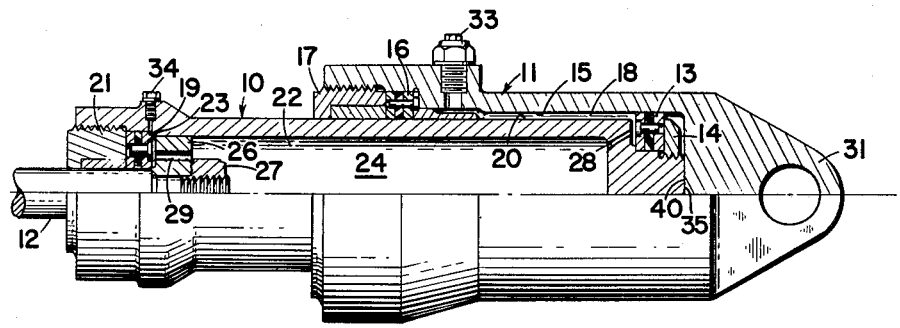
FIGURE 1 is a side elevation partially in longitudinal section showing a spring according to this invention in the normal static position.

The liquid spring includes a main cylinder 10 which telescopes into an outer cylinder 11 and a plunger 12 projecting into the main cylinder 10. A seal assembly 13 is mounted on the inner end of the main cylinder 10 by a nut 14 and provides a sealing engagement with the inner wall 15 of the outer cylinder 11. A similar seal assembly 16 is mounted on the outer cylinder 11 adjacent to its outer end by a gland nut 17 and provides sealing engagement with the outer surface 20 of the main cylinder 10. The outer surface 20 of the main cylinder 10 is formed with a diameter slightly smaller than the inner surface 15 of the outer cylinder 11 so that the two cylinders 10 and 11 and the seal assemblies 13 and 16 co-operate to define a first chamber 18 between the cylinders and seal assemblies.

A third seal assembly 19 is mounted on the outer end of the main cylinder 10 by a gland nut 21 and extends into sealing engagement with the plunger 12. The sealing assemblies 13, 16, and 19 are preferably formed according to a structure of the type disclosed in the co-pending application of Arthur L. Lindow and Richard A. Graff, Serial No. 597,629, filed July 13, 1956, now abandoned, and reference should be made to that application for a detailed description of the structure of this preferred seal assembly. It should be understood, however, that other types of seals could be used providing they are capable of withstanding the pressures encountered in liquid springs.

The main cylinder 10, the plunger 12, and the seal assembly 19 co-operate to define a main fluid cavity 22 which is divided into second and third chambers 23 and 24 by a piston head 26 mounted on the inner end of the plunger 12 by a nut fastener 27. To provide a fluid communication between the first and third fluid chambers 18 and 24 respectively, a damping orifice 28 is formed in the main cylinder 10 adjacent to its inner end, and to provide fluid communication between the second and third chambers 23 and 24, a damping orifice 29 is provided through the piston head 26.

The three chambers 18, 23, and 24 are entirely filled with a compressible liquid under pressure which produces reaction forces tending to urge the outer cylinder 11 to the left relative to the main cylinder 10 and the plunger 12 to the left relative to the main cylinder 10. Suitable mounting portions 31 and 32 are formed on the outer cylinder 11 and the plunger 12 respectively so that the spring can be connected to the associated load in a conventional manner. It should be understood that movement of the outer cylinder 11 to the right from the position of FIGURE 1 toward the position of FIGURE 2 reduces the volume of the first chamber 18 and causes liquid to flow therefrom through the damping orifice 28 into the third chamber 24. The flow of liquid into the third chamber 24 compresses the liquid in all three chambers raising the pressure to a point where a higher reaction force is developed urging the outer cylinder 11 to the left relative to the main cylinder 10. In other words, the liquid under pressure within the spring produces a force reaction urging the outer cylinder 11 to the left which force reaction is the product of the pressure of the liquid within the first chamber 18 times the effective area of the first chamber 18. The effective area of the first chamber 18 is equal to the area defined by the inner wall 15 of the outer cylinder 11 minus the area defined by the outer wall 20 of the main cylinder 10.

When a tension force is applied between the two mounting portions 31 and 32, there are two reactions which resist the extension of the spring appearing as movement of the outer cylinder 11 to the right relative to the main cylinder 10. The first is created by the compression of the liquid within the three chambers 18, 23, and 24 and the second is the dynamic damping action of the flow through the orifice 28. Once the two cylinders cease to move relative to each other, the spring reaction stabilizes and is a function of the equalized pressure of the liquid. The damping action only takes place during movement between the two cylinders 10 and 11 which causes flow through the orifice 28. It should be understood that when a tension force is applied to the spring, the plunger 12 cannot move to the left from its position shown in FIGURES 1 and 2 because the piston head 26 engages the seal assembly 19 and mechanically prevents such movement.

Figure 2:
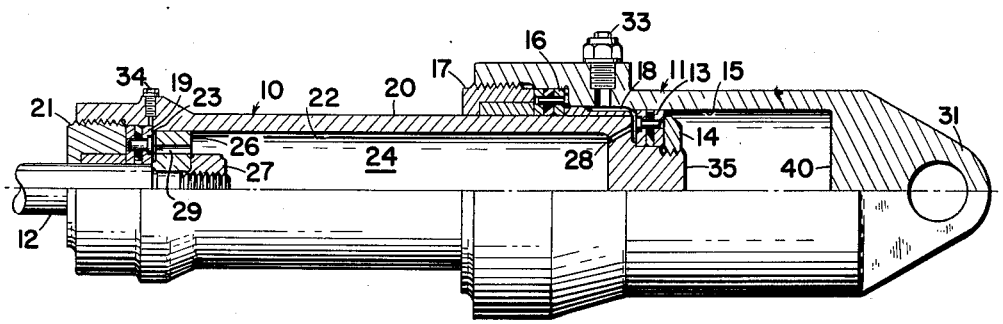
FIGURE 2 is a view similar to FIGURE 1 showing the positions of the elements in the fully extended position.
Figure 3:
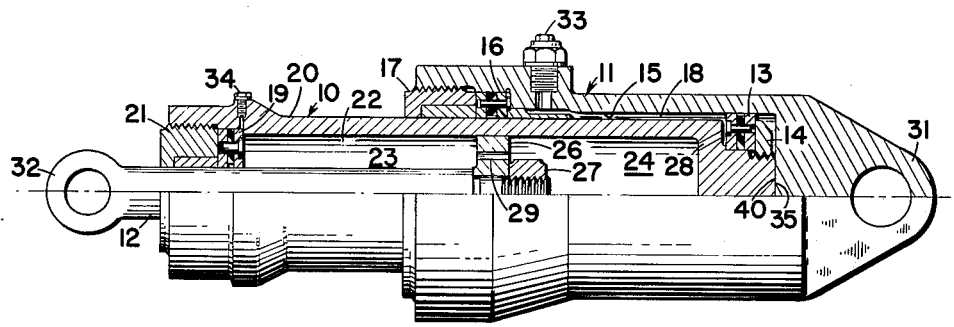
FIGURE 3 is a view similar to FIGURES 1 and 2 showing the position of the elements when the spring is in the compressed position.

When a compression force is applied between the two mounting portions 31 and 32, the spring is compressed from the static position of FIGURE 1 toward the compressed position of FIGURE 3. During such compression, there is no relative movement between the two cylinders 10 and 11 because the inner end 35 of the main cylinder 10 engages the end wall 40 of the outer cylinder 11, but the plunger 12 moves to the right into the main cylinder 10. This causes a displacement of the volume within the cavity 22 which is equal to the cross-sectional area of the plunger 12 times the stroke of the plunger. This displacement, of course, compresses the liquid contained within the three chambers 18, 23, and 24 raising the pressure and increasing the reaction force developed on the plunger. In addition, damping is provided because the volume of the third chamber 24 reduces rapidly while the volume of the second chamber increases. This causes a displacement of liquid through the damping orifice 29 which resists movement between the plunger 12 and the main cylinder 10. It should be understood that the volume of the cavity 22 is always equal to the sum of the volumes of the second and third chambers 23 and 24 and that even though the volume of the second chamber 23 increases, the total volume of the two chambers decreases as the plunger 12 moves to the right.

Figure 4:
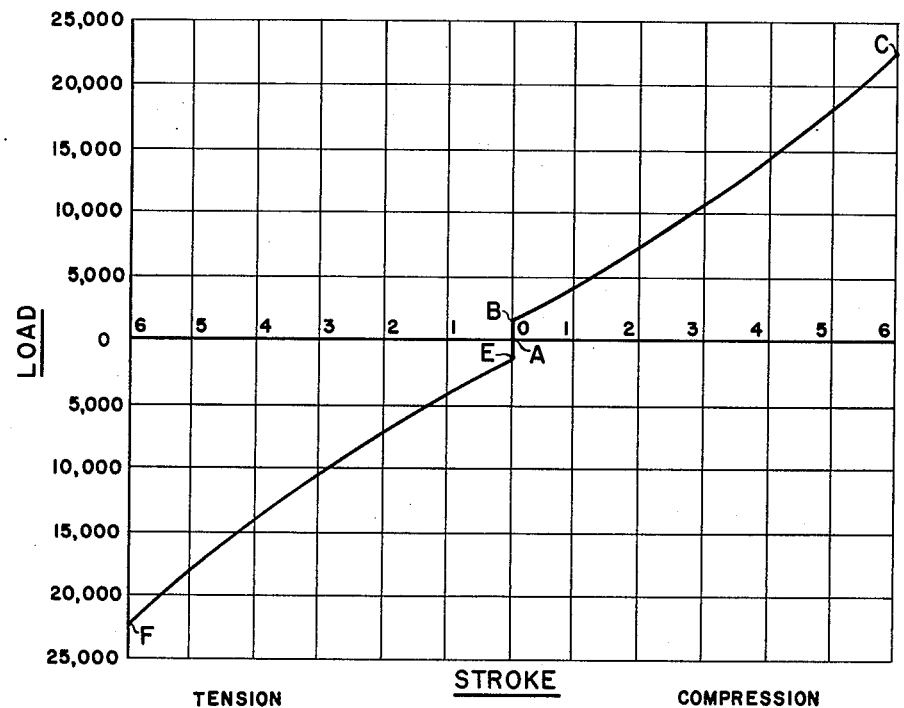
FIGURE 4 is a load stroke diagram illustrating the operation of the spring in both tension and compression.

The liquid filling the three chambers 18, 23, and 24 is initially charged to a precharged pressure which is normally in the order of 1,000 p.s.i. so the elements are resiliently urged to the static position of FIGURE 1. During the charging of the spring, liquid is supplied through a charging fitting 33 and entrapped air is removed through a bleed fitting 34. The operation of the spring is shown in the load stroke curve of FIGURE 4 wherein the static position is illustrated at A. Because of the precharge pressure, a compression load will not cause movement of the plunger 12 to the right until a compression force B is reached. Once this force is reached, additional force will cause displacement of the plunger 12 to the right along the curce BC. If, however, the spring is subjected to a tension load, the precharge pressure again will prevent displacement or movement of the outer cylinder 11 until a tension force represented at E is reached. If the tension force exceeds the value at E, the spring will be extended along the line represented by the curve EF.

In the illustrated curve, the two spring curves BC and EF are similar and if this is the desired arrangement, the effective area of the first chamber 18 should be equal to the cross-sectional area of the plunger 12. If, however, a higher spring rate is desired in tension than in compression, it is merely necessary to arrange the effective area of the first chamber 18 greater than the cross-sectional area of the plunger 12. Conversely, if a lower spring rate is desired in tension when compared to the spring rate of compression, the plunger 12 should be formed with a larger cross-sectional area than the effective area of the first chamber 18. Because the outer cylinder 11 extends back along the main cylinder 10, the overall length of the device is short when compared to previous structures for double-acting liquid springs.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A double acting liquid spring comprising, a first cylinder forming a main chamber, liquid filling said main chamber, a second cylinder telescopically disposed with respect to the first cylinder, an annular chamber formed between said first cylinder and said second cylinder, liquid filling said annular chamber, means supporting said second cylinder on said first cylinder for reciprocation of said second cylinder relatively to said first cylinder to contract and to expand said annular chamber and said liquid in the annular chamber being compressed by contraction of the annular chamber, a damping orifice connecting said main chamber and said annular chamber for flow of liquid from said annular chamber to said main chamber upon contraction of the annular chamber and for flow of liquid from said main chamber to said annular chamber upon expansion of said annular chamber, a plunger reciprocably supported in said first cylinder for movement into the main chamber formed in said first cylinder to compress the liquid in said main chamber, and said second cylinder and said plunger being disposed at opposite ends of the first cylinder for movement of the second cylinder relatively to the first cylinder independently of movement of the plunger upon application of a tension load to the liquid spring and for movement of the plunger into the first cylinder independently of movement of the second cylinder upon application of a compression load to the liquid spring.

2. A double acting liquid spring comprising, a first cylinder forming a main chamber, liquid filling said main chamber, a second cylinder telescopically disposed with respect to the first cylinder, an annular chamber formed between said first cylinder and said second cylinder, liquid filling said annular chamber, means supporting said second cylinder on said first cylinder for reciprocation of said second cylinder relatively to said first cylinder to contract and to expand said annular chamber and said liquid in the annular chamber being compressed upon contraction of said annular chamber by application of a tension load to said liquid spring, a damping orifice connecting said main chamber and said annular chamber for flow of liquid from said annular chamber to said main chamber upon contraction of the annular chamber and for flow of liquid from said main chamber to said annular chamber upon expansion of said annular chamber, and a plunger reciprocably supported in said first cylinder for movement into the main chamber formed in said first cylinder to compress liquid in said main chamber by application of a compression load to the liquid spring.

3. A double acting liquid spring comprising, a first cylinder forming a main chamber, liquid filling said main chamber, a second cylinder telescopically disposed with respect to the first cylinder on one end of the first cylinder, a liquid seal on said one end of the first cylinder disposed between the first cylinder and the second cylinder, an annular chamber formed between said first cylinder and said second cylinder and said seal closing one end of said annular chamber, liquid filling said annular chamber, means supporting said second cylinder on said first cylinder for reciprocation of said second cylinder relatively to said first cylinder to contract and to expand said annular chamber and said liquid in the annular chamber being compressed by contraction of the annular chamber upon application of a tension load to the liquid spring, a damping orifice connecting said main chamber and said annular chamber for flow of liquid from said annular chamber to said main chamber upon contraction of the annular chamber and for flow of liquid from said main chamber to said annular chamber upon expansion of said annular chamber, and a plunger reciprocably supported in said first cylinder for movement into the main chamber formed in said first cylinder to compress the liquid in said main chamber upon application of a compression load to the liquid spring.

4. A double acting liquid spring comprising, a first cylinder forming a main chamber, liquid filling said main chamber, a second cylinder telescopically disposed with respect to the first cylinder, an annular chamber formed between said first cylinder and said second cylinder, liquid filling said annular chamber, means supporting said second cylinder on said first cylinder for reciprocation of said second cylinder relatively to said first cylinder to contract and to expand said annular chamber and the liquid in said annular chamber being compressed by contraction of said annular chamber upon application of a tension load to the liquid spring, a plunger reciprocably supported in said first cylinder for movement into the main chamber formed in said first cylinder to compress the liquid in said main chamber upon application of a compression load to the liquid spring, and said second cylinder and said plunger being disposed at opposite ends of the first cylinder for movement of the second cylinder relatively to the first cylinder independently of movement of the plunger upon application of a tension load to the liquid spring and for movement of the plunger into the first cylinder independently of movement of the second cylinder upon application of a compression load to the liquid spring.

5. A double acting liquid spring comprising, a first cylinder forming a main chamber, liquid filling said main chamber, a second cylinder telescopically disposed with respect to the first cylinder, an annular chamber formed between said first cylinder and said second cylinder, liquid filling said annular chamber, means supporting said second cylinder on said first cylinder for reciprocation of said second cylinder relatively to said first cylinder to contract and to expand said annular chamber and the liquid in said annular chamber being compressed by contraction of the annular chamber upon application of a tension load to the liquid spring, a plunger in said first cylinder including a piston engaging said first cylinder and reciprocably supported in said first cylinder for movement into the main chamber formed in said first cylinder to compress the liquid in said main chamber upon application of a compression load to the liquid spring, and a damping orifice in said piston for flow of liquid from one side of the piston to the other side thereof upon compression of the liquid in the main chamber.

6. A double acting liquid spring comprising, a first cylinder forming a main chamber, liquid filling said main chamber, a second cylinder telescopically disposed on one end of said first cylinder, an annular chamber formed between said first cylinder and said second cylinder, liquid filling said annular chamber, means supporting said second cylinder on said first cylinder for reciprocation of said second cylinder relatively to said first cylinder to contract and to expand said annular chamber and the liquid in said annular chamber being compressed by contraction of said annular chamber upon application of a tension load to the liquid spring, said second cylinder bottoming against said one end of the first cylinder in the expanded condition of the annular chamber, and a plunger reciprocably supported in said first cylinder at the end thereof opposite said one end of the first cylinder for movement into the main chamber formed in said first cylinder to compress the liquid in said main chamber upon application of a compression load to the liquid spring.

7. A double acting liquid spring comprising, a first cylinder forming a main chamber, liquid filling said main chamber, a second cylinder telescopically disposed with respect to the first cylinder, an annular chamber formed between said first cylinder and said second cylinder, liquid filling said annular chamber, means supporting said second cylinder on said first cylinder for reciprocation of said second cylinder relatively to said first cylinder to contract and to expand said annular chamber and said liquid in said annular chamber being compressed by contraction of the annular chamber upon application of a compression load to the liquid spring, a plunger including a piston reciprocably supported in said first cylinder for movement into the main chamber formed in said first cylinder to compress the liquid in said main chamber upon application of a compression load to the liquid spring, and said piston bottoming against a portion of the first cylinder to define the extended position of the plunger.

8. A double acting liquid spring comprising, a first cylinder forming a main chamber, liquid filling said main chamber, a second cylinder telescopically disposed on one end of said first cylinder, an annular chamber formed between said first cylinder and said second cylinder, liquid filling said annular chamber, means supporting said second cylinder on said first cylinder for reciprocation of said second cylinder relatively to said first cylinder to contract and to expand said annular chamber and the liquid in said annular chamber being compressed by contraction of said annular chamber upon application of a tension load to the liquid spring, said second cylinder bottoming against one end of the first cylinder in the expanded condition of the annular chamber, a plunger including a piston reciprocably supported in said first cylinder for movement into the main chamber formed in said first cylinder to compress the liquid in said main chamber upon application of a compression load to the liquid spring, and said piston bottoming against a portion of the first cylinder to define the extended position of the plunger.

References Cited in the file of this patent

UNITED STATES PATENTS

| | | |
|---|---|---|
| 1,780,659 | Wallace | Nov. 4, 1930 |
| 2,785,887 | Taylor et al. | Mar. 19, 1957 |
| 2,819,064 | Peras | Jan. 7, 1958 |
| 2,873,963 | Taylor | Feb. 17, 1959 |